(12) United States Patent
Kohli et al.

(10) Patent No.: US 8,393,175 B2
(45) Date of Patent: *Mar. 12, 2013

(54) METHODS FOR EXTRACTING STRENGTHENED GLASS SUBSTRATES FROM GLASS SHEETS

(75) Inventors: Jeffrey Todd Kohli, Corning, NY (US); Robert Sabia, Corning, NY (US)

(73) Assignee: Corning Incorporated, Corning, NY (US)

(*) Notice: Subject to any disclaimer, the term of this patent is extended or adjusted under 35 U.S.C. 154(b) by 273 days.

This patent is subject to a terminal disclaimer.

(21) Appl. No.: 12/868,927

(22) Filed: Aug. 26, 2010

(65) Prior Publication Data

US 2012/0052252 A1  Mar. 1, 2012

(51) Int. Cl.
*C03C 15/00* (2006.01)
*C03B 33/02* (2006.01)
(52) U.S. Cl. .......................... 65/30.14; 65/105
(58) Field of Classification Search ............... 65/30.14, 65/61, 63–65, 105
See application file for complete search history.

(56) References Cited

U.S. PATENT DOCUMENTS

| | | | | |
|---|---|---|---|---|
| 3,615,322 A * | 10/1971 | Bogart et al. | ............... | 65/30.14 |
| 3,981,709 A * | 9/1976 | Kondo et al. | ............... | 65/30.14 |
| 4,023,945 A * | 5/1977 | Boaz | ............... | 65/112 |
| 5,733,622 A * | 3/1998 | Starcke et al. | ............... | 428/64.1 |
| 6,845,635 B2 * | 1/2005 | Watanabe et al. | ............ | 65/30.14 |
| 7,197,897 B2 * | 4/2007 | Jacobson et al. | ............. | 65/30.14 |
| 7,703,303 B2 * | 4/2010 | Isono et al. | ................ | 65/30.14 |
| 7,810,355 B2 * | 10/2010 | Feinstein et al. | .............. | 65/30.1 |
| 2010/0279067 A1 * | 11/2010 | Sabia et al. | ................ | 428/141 |
| 2011/0003619 A1 * | 1/2011 | Fujii | ........................... | 455/566 |
| 2012/0011981 A1 * | 1/2012 | Brown | ........................ | 83/880 |
| 2012/0048604 A1 * | 3/2012 | Cornejo et al. | .............. | 174/258 |
| 2012/0052252 A1 * | 3/2012 | Kohli et al. | .................. | 428/174 |
| 2012/0135177 A1 * | 5/2012 | Cornejo et al. | ................ | 428/43 |
| 2012/0145331 A1 * | 6/2012 | Gomez et al. | ................ | 156/712 |
| 2012/0196071 A1 * | 8/2012 | Cornejo et al. | ................ | 428/43 |
| 2012/0214004 A1 * | 8/2012 | Hashimoto et al. | .......... | 428/428 |
| 2012/0216570 A1 * | 8/2012 | Abramov et al. | ............ | 65/30.14 |

FOREIGN PATENT DOCUMENTS

| | | |
|---|---|---|
| WO | 2005097439 | 10/2005 |
| WO | 2009059786 | 5/2009 |

* cited by examiner

*Primary Examiner* — Jason L. Lazorcik
(74) *Attorney, Agent, or Firm* — Robert P. Santandrea

(57) ABSTRACT

Methods for extracting strengthened glass substrates from glass sheets are described herein. In one embodiment, the method for extracting strengthened glass substrates from glass sheets comprises forming a plurality of channel segments in the glass sheet. The plurality of channel segments may extend through the thickness of the glass sheet and are separated by remnant glass webs connecting the glass substrate to the glass sheet. The plurality of channel segments extend around a perimeter of the glass substrate. Thereafter, the glass sheet is strengthened by ion-exchange. The glass substrate is then separated from the glass sheet by severing the glass substrate from the remnant glass webs.

12 Claims, 6 Drawing Sheets

METHODS FOR EXTRACTING STRENGTHENED GLASS SUBSTRATES FROM GLASS SHEETS

BACKGROUND

1. Field

The present specification generally relates to methods for extracting glass substrates from glass sheets and, more specifically, to methods for extracting strengthened glass substrates from glass sheets.

2. Technical Background

Thin glass substrates have a variety of applications in consumer electronic devices. For example, such glass substrates may be used as cover sheets and/or touch screens for LCD and LED displays incorporated in mobile telephones, GPS devices, display devices such as televisions and computer monitors and various other electronic devices. As use the use of glass substrates in various devices continues to expand, the geometric complexity of the glass substrates also increases. For example, certain applications may require that the glass substrates be formed with complex shapes, such as curved peripheries and/or through-features, thus requiring additional machining operations to achieve the desired geometry.

The glass substrates may be formed by separating a glass sheet into a plurality of discrete glass. The glass sheet may formed from damage resistant glass, such as ion-exchanged glass or similarly strengthened glass. For example, the ion-exchange process creates a compressive stress at the surfaces of the glass substrate. These compressive stresses extend beneath the surface of the glass substrate to a certain depth, referred to as the depth of layer. The compressive stresses are balanced by a layer of tensile stresses (referred to as central tension) such that the net stress in the glass substrate is zero. The formation of compressive stresses at the surface of the glass substrate counters crack propagation in the compressive layer and, as such, mitigates catastrophic failure of the glass substrate for flaws which do not extend through the depth of layer.

However, strengthened glass substrates are susceptible to edge damage, especially after the glass substrates are separated from a glass sheet after the strengthening process has been performed. More specifically, separating the glass substrate after ion-exchange processing leaves the central tension layer exposed at the edges of the glass substrate, thereby leaving the edge susceptible to damage which may lead to catastrophic failure.

Moreover, when a glass substrate is intended for use as a touch screen, electrically conductive coatings may be applied to the glass substrate. Such coatings are commonly applied to a glass sheet prior to separating the glass sheet into a plurality of discrete glass substrates. However, these coatings are not able to withstand the ion-exchange process, thus compounding the aforementioned problems.

SUMMARY

According to one embodiment, a method of extracting a strengthened glass substrate from a glass sheet includes forming a plurality of channel segments in the glass sheet. The plurality of channel segments extend through the thickness of the glass sheet and the channel segments are separated from each other by remnant glass webs connecting the glass substrate to the glass sheet. The plurality of channel segments extend around a perimeter of the glass substrate. Thereafter, the glass sheet is strengthened by ion-exchange. The glass substrate is then separated from the glass sheet by severing the glass substrate from the remnant glass webs connecting the glass substrate to the glass sheet.

In another embodiment, a method of separating an ion-exchange-strengthened glass substrate from a glass sheet includes strengthening the glass sheet by ion-exchange. Thereafter, a coating material is applied to the glass sheet. The glass sheet is then segmented into a plurality of glass substrates along straight parting lines. At least one curved feature is formed in the glass substrate after the glass substrate is separated from the glass sheet. The perimeter of the glass substrate is then finished such that the perimeter of the glass substrate is in compression.

In yet another embodiment, a glass substrate for use as a cover glass with touch screen functionality includes an ion-exchanged glass having a first surface, a second surface opposite the first surface, and a perimeter. The perimeter includes at least one curved feature along a length of the glass substrate, the at least one curved feature having a maximum radius of curvature of less than 10 mm. The perimeter may be under compression. An optically-transparent and electrically-conductive coating may be applied to at least one of the first surface or the second surface. The glass substrate may be formed by a process which comprises: strengthening a glass sheet by ion-exchange; applying an optically-transparent and electrically-conductive coating material to the glass sheet; separating the glass substrate from the glass sheet; and finishing the perimeter of the glass substrate such that the perimeter is under compression.

Additional features and advantages of the invention will be set forth in the detailed description which follows, and in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of methods for extracting strengthened glass substrates from glass sheets. FIGS. 1A-1E schematically depict one embodiment of a method for extracting a strengthened glass substrate from a glass sheet. In this embodiment the method generally comprises forming a plurality of channel segments in the glass sheet. The plurality of channel segments may extend through the thickness of the glass sheet and the channel segments are separated from each other by remnant glass webs connecting the glass substrate to the glass sheet. The plurality of channel segments extend around a perimeter of the glass substrate. Thereafter, the glass sheet is strengthened by ion-exchange. The glass substrate is then separated from the glass sheet by severing the glass substrate from the remnant glass webs connecting the glass substrate to the glass sheet. Methods for extracting strengthened glass substrates from glass sheets and glass substrates extracted according to the methods will be described in further detail herein with specific reference to the appended figures.

Referring now to FIGS. 1A-1E, one embodiment of a method for extracting a strengthened glass substrate 102 from a glass sheet 100 is schematically depicted. In some embodiments described herein the glass sheet generally have a thickness of 0.2 mm or greater. In other embodiments the glass sheet may have a thickness from about 0.5 mm to about 2.5 mm. However, it should be understood that the techniques described herein may also be used in conjunction with glass sheets having thicknesses less than 0.5 mm or greater than 2.5 mm. The glass sheet 100 may be formed from alkali silicate glasses which are susceptible to chemical strengthening, such as, for example, alkali-aluminosilicate glasses. However, in the method for extracting a strengthened glass substrate from a glass sheet schematically depicted in FIGS. 1A-1E, it should be understood that the glass sheet is initially in an as-formed, un-strengthened condition (i.e., prior to chemical strengthening).

Figure 1A:
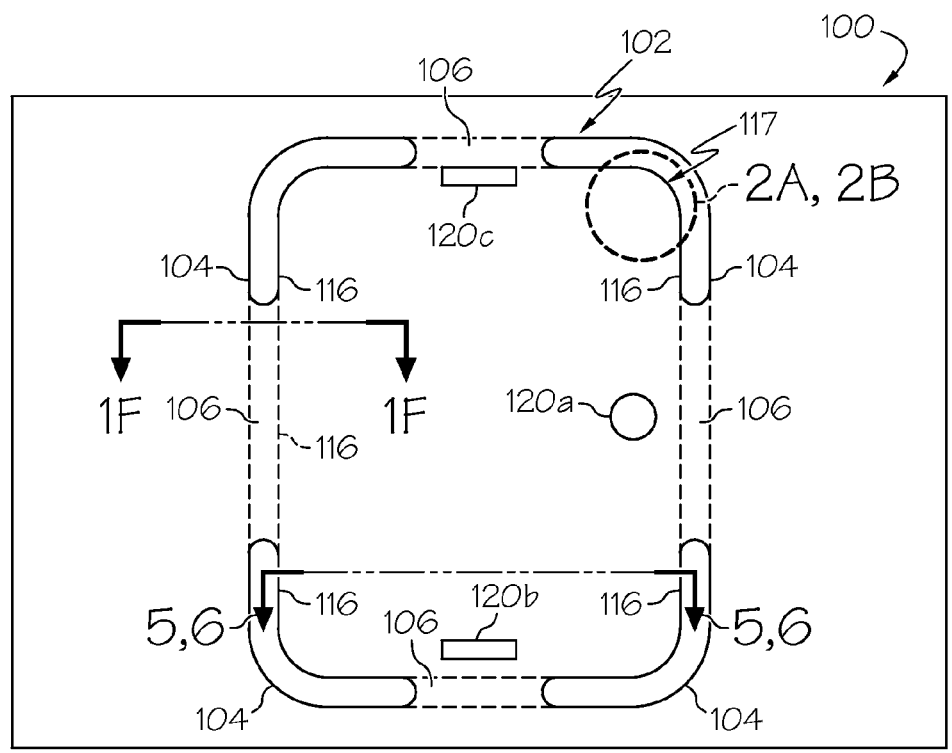
FIG. 1A schematically depicts a glass substrate connected to a glass sheet with a plurality of remnant webs, according to one or more embodiments of a method for extracting a strengthened glass substrate from a glass sheet shown and described herein.

Referring to FIG. 1A, an initial step of one embodiment of a method for extracting a strengthened glass substrate 102 from a glass sheet 100 is schematically depicted. The initial step comprises forming a plurality of channel segments 104 in an un-strengthened glass sheet 100. The channel segments 104 generally define the perimeter 116 of the glass substrate 102. In the embodiments shown herein, the channel segments 104 extend through the thickness of the glass substrate 102 such that the glass substrate is spaced apart from the glass sheet 100 by a width of the channel segment. However, the channel segments 104 are not continuous around the entire perimeter 116, which defines the glass substrate 102. Instead, individual channel segments 104 are separated from one another by a remnant glass web 106. The remnant glass webs 106 connect the glass substrate 102 to the glass sheet 100 such that, after the plurality of channel segments 104 are formed in the glass sheet 100, the glass substrate 102 remains connected to the glass sheet 100.

In the embodiments described herein, the channel segments 104 may be formed in the glass sheet 100 using a variety of techniques. For example, in one embodiment, the channel segments 104 may be formed by laser processing, such as laser ablation or laser through-cutting. In another embodiment, the channel segments 104 may be formed in the glass sheet 100 by a machining operation, such as computer numeric control (CNC) machining, or a similar machining process. In yet another embodiment, the channel segments may be formed with an etching process, such as when the pattern of the channel segments 104 is masked and a chemical etchant is applied to the glass sheet 100 to remove the glass in the channel segments 104. In still another embodiment, the channel segments may be formed by water jet cutting. In yet another embodiment, a combination of techniques may be used. For example, in one embodiment, the channel segments may be formed by water-jet cutting and, thereafter, CNC machining may be used to finish the sides of the channel segments and form chamfers and/or bevels in the edges of the glass substrate. While specific techniques for forming the channel segments 104 in the glass sheet are referenced herein, it should be understood that other techniques may also be employed.

Figure 2A:
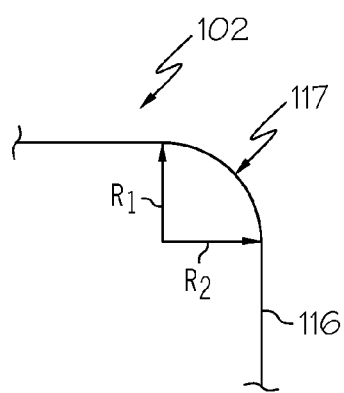
FIG. 2A schematically depicts a corner of a glass substrate with a constant radius of curvature, according to one or more embodiments shown and described herein.
Figure 2B:
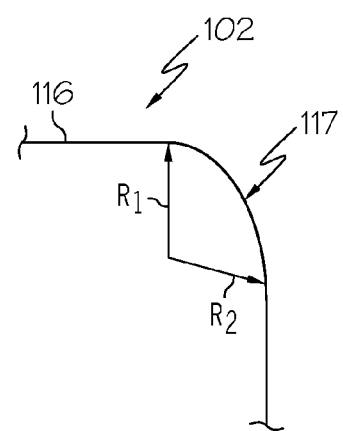
FIG. 2B schematically depicts a corner of a glass substrate with a complex spline, according to one or more embodiments shown and described herein.

The channel segments 104 are formed in the glass sheet 100 such that the channel segments 104 form at least one curved feature in the perimeter 116 of the glass substrate 102. For example, in the embodiment shown in FIG. 1A, the channel segments 104 are formed such that each corner 117 of the glass substrate has a radius of curvature. In one embodiment, the corner 117 may be formed with a uniform radius of curvature as shown in FIG. 2A such that the first radius R1 equals the second radius R2. In another embodiment, the corner 117 may be formed with a spline with a compound radius of curvature as depicted in FIG. 2B. The term "spline," as used herein refers to an arc in which the radius of curvature of the arc varies over the length of the arc. For example, the radius of curvature of the corner 117 may decrease from a maximum radius R1 to a minimum radius R2.

While the embodiments shown in FIGS. 1A and 2A-2B depict a curved feature forming a corner 117 of the glass substrate 102, it should be understood that various other curved features may be formed in the perimeter of the glass substrate 102. For example, the curved feature may be formed along the perimeter 116 of the glass substrate 102 in a location other than the corner 117, such as when one or more curved features are formed in the perimeter 116 of the substrate along a length of the glass substrate 102. In one embodiment, the maximum radius of curvature of the curved feature is less than about 10 mm. In another embodiment, the maximum radius of curvature of the curved feature is 5 mm or less or even 2 mm or less. However, it should be understood that curved features having a maximum radius of greater than or equal to 10 mm may also be formed in the glass substrate 102.

Moreover, in one embodiment, the channel segments 104 are formed in the glass sheet 100 such that a chamfer or bevel is formed at the intersection of the perimeter 116 of the glass substrate 102 with the top surface 114 and the bottom surface 115 of the glass substrate 102. For example, referring to FIG. 5, one embodiment of a glass substrate 102 is shown in cross section. In this embodiment, the channel segments have been formed in the glass sheet 100 such that the intersections of the perimeter 116 with the top surface 114 and the bottom surface 115 are each formed with a bevel 144 having a radius r. In the embodiments shown herein, the bevel 144 may have a radius from about 0.1 mm to about 10 mm.

Figure 6:
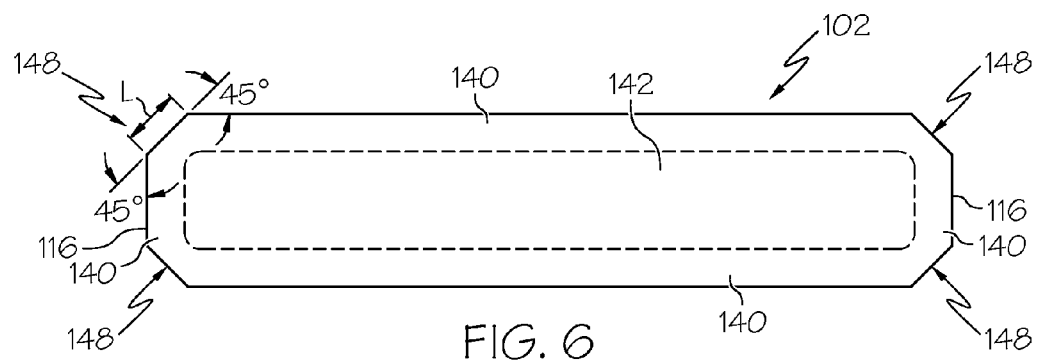
FIG. 6 schematically depicts a cross section of a strengthened glass substrate after the perimeter of the substrate is finished, according to another embodiment shown and described herein.

Referring now to FIG. 6, an alternative embodiment of the glass substrate 102 is shown in cross section. In this embodiment, the channel segments have been formed in the glass sheet 100 such that the intersections of the perimeter 116 with the top surface 114 and the bottom surface 115 are each formed with a chamfer 148. In the embodiments shown herein, the chamfer 148 is a 45 degree chamfer with a hypotenuse having a length L from about 0.1 mm to about 0.2 mm. However, it should be understood that, in other embodiments (not shown), chamfers of different configurations and dimensions may be formed along the perimeter of the glass substrate 102.

The remnant glass webs 106 between the channel segments 104 have the same thickness as the remainder of the glass sheet 100 in the embodiment depicted. However, in other embodiments, the remnant glass webs 106 may have a thickness which is less than the thickness of the remainder of the glass sheet 100. For example, referring to FIG. 1F, when the channel segments 104 are formed in the glass sheet 100, material may be removed from the remnant glass webs 106 thereby reducing the thickness of the remnant glass webs 106 while keeping the glass substrate 102 connected to the glass sheet 100, as shown in FIG. 1F. This may be done to facilitate easily removing the glass substrate 102 from the glass sheet 100 in a subsequent processing step. In addition, chamfers 148 may be formed in the glass substrate 102 adjacent to the remnant glass web 106 when the remnant glass web 106 is thinned, as depicted in FIG. 1F. While FIG. 1F depicts a chamfer 148 formed in the glass substrate 102, it should be understood that, in alternative embodiments, bevels may be formed in the glass substrate, as described further herein. In the embodiments shown and described herein, the bevels or chamfers formed in the perimeter of the glass substrate adjacent to the remnant glass webs may have the same geometry and dimensions as chamfers or bevels formed in the perimeter of the glass substrate adjacent to the channel segments.

Forming the channel segments 104 in the un-strengthened glass sheet 100, as described herein, reduces cracking or chipping of the glass substrate, particularly in areas adjacent to the perimeter 116 of the glass substrate 102 where the substrate is most susceptible to damage both during machining of ion-exchanged glass and during subsequent use of the glass substrate. Moreover, forming the channel segments in the un-strengthened glass sheet exposes the perimeter edge of the glass substrate which, in turn, facilitates chemically strengthening the perimeter of the glass substrate 102 in a subsequent processing step while the glass substrate 102 remains attached to the glass sheet 100.

In one embodiment, the initial step of the method for extracting a glass substrate 102 from a glass sheet 100 may further comprise forming additional through-features 120a, 120b, 120c in the glass substrate 102, as shown in FIG. 1A. The through-features may extend through the thickness of the glass substrate 102 and may comprise a variety of different geometries. For example, the through-features may be circular apertures 120a, slots 120b or notches 120c, as depicted in FIG. 1A. However, it should be understood that through-features with various other regular or irregular geometrical configurations may also be formed. In the embodiments described herein, the through-features may be formed in the glass substrate using the same techniques utilized to form the channel segments 104. While the through-features may be formed with various radii, in some embodiments, the maximum radius of curvature of the through-feature may be less than 10 mm. In other embodiments the maximum radius of curvature may be less than about 5 mm or even less than about 2 mm. The planar dimensions of the through-features, radii of curvature of the through-features, and any chamfers and/or bevels formed around the perimeter of the through features depend on the thickness of the glass and the techniques used to form the through-features.

It should be understood that the formation of through-features in the glass substrate 102 of the glass sheet 100, in addition to the channel segments 104 is optional. For example, in one embodiment, the glass substrate 102 of the glass sheet 100 may be formed without through-features while in other embodiments one or even a plurality of through-features may be formed in the glass substrate 102 of the glass sheet 100 in addition to the channel segments 104.

In one embodiment, the glass sheet 100 may be annealed before formation of the channel segments 104 and through-features to reduce or eliminate residual stresses present in the glass sheet which may lead to cracking or chipping of the glass sheet during formation of the channel segments 104 and/or through-features. Alternatively or additionally, the glass sheet 100 may be annealed after formation of the channel segments 104 and through-features. The annealing step may be utilized to reduce stresses that develop in the glass sheet 100 during formation of the channel segments and/or through-features. For example, where laser processing is used to form the channel segments of the through-features, thermal stresses may remain in the glass sheet following processing. The annealing step may be utilized to relieve these residual stresses such that the glass sheet 100 (including the glass substrate 102) is substantially stress-free. In order to anneal the glass sheet 100, the glass sheet may be heated to the annealing point of the glass (i.e., to a temperature where the dynamic viscosity of the glass is about $1 \times 10^{13}$ Poise). However, it should be understood that the annealing step is optional and that, in some embodiments, the glass sheet may be strengthened after formation of the channel segments and through-features without first undergoing an annealing step.

Figure 5:
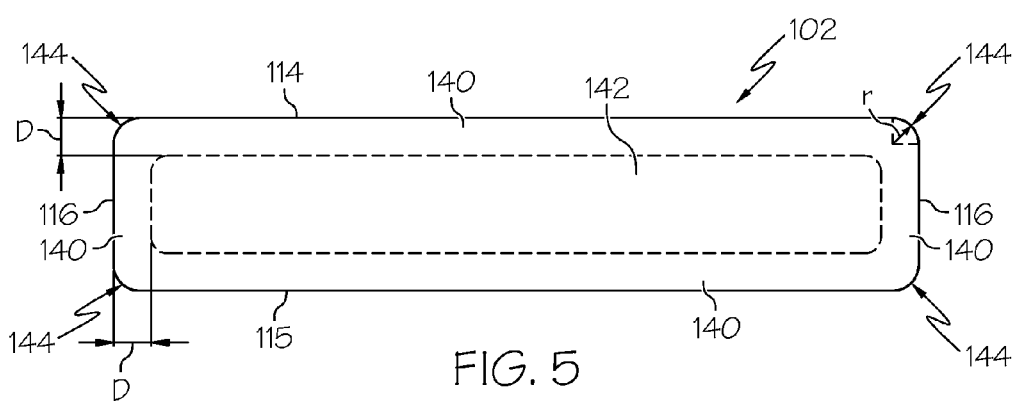
FIG. 5 schematically depicts a cross section of a strengthened glass substrate after the perimeter of the substrate is finished, according to one embodiment shown and described herein.

Still referring to FIG. 1A, the glass sheet 100, including the glass substrate 102 connected to the glass sheet 100, is strengthened with a chemical strengthening process after the channel segments 104 and the desired through-features are formed in the glass sheet 100 and glass substrate 102. For example, in one embodiment, the glass sheet 100 is chemically strengthened by ion-exchange in which smaller sodium ions near the surface of the glass are exchanged with larger potassium ions. Replacement of the smaller sodium ions with the larger potassium ions causes a layer of compressive stress to develop in the surfaces of the glass sheet 100. The compressive stress extends below the surfaces of the glass sheet to a specified depth of layer D, as shown in FIG. 5. For example, FIG. 5 depicts a cross section of one embodiment of the glass substrate 102 of the glass sheet 100 after ion-exchange strengthening. A layer of compressive stress 140 extends from the top surface 114, bottom surface 115 and perimeter 116 of the glass substrate 102 to a depth of layer D. The compressive stress 140 is balanced by the development of a layer of central tension 142 at the center of the glass substrate 102. As depicted in FIGS. 1A and 5, the layer of compressive stress 140 extends into the glass substrate 102 from the portion of the perimeter 116 that is exposed in the channel segments 104 formed in the glass sheet 100. However, those portions of the perimeter 116 of the glass substrate 102 which are connected to the glass sheet 100 with the remnant glass webs 106 do not develop a similar layer of compressive stress, as will be discussed in further detail herein. FIG. 6 shows a similar layer of compressive stress 140 and a corresponding layer of central tension 142 in a glass substrate 102 having chamfers formed 148 formed in the perimeter 116.

In the embodiments described herein, the compressive stress and depth of layer developed in the glass sheet 100 and glass substrate 102 by strengthening are sufficient to improve the damage tolerance of the glass substrate 102 while also facilitating further processing (such as by machining or laser processing) without risk of introducing flaws into the substrate. In one embodiment, the compressive stress may be from about 200 MPa to about 1000 MPa. In another embodiment, the compressive stress may be from about 500 MPa to about 800 MPa. In yet another embodiment, the compressive stress may be from about 650 MPa to about 900 MPa. In one embodiment, the depth of layer D may be from about 10 microns to about 80 microns. In another embodiment, the depth of layer D may be from about 30 microns to about 60 microns. In yet another embodiment, the depth of layer D may be from about 40 microns to about 60 microns.

While specific reference has been made herein to use of an ion-exchange strengthening process in which sodium ions are replace with potassium ions, it should be understood that the specific ion exchange process utilized to strengthen the glass sheet is dependent on the composition of the glass from which the glass sheet is formed. For example, other ion-exchange processes may be utilized in which different ions are exchanged in order to strengthen the glass, such as when lithium ions and/or other alkali ions are exchanged for sodium ions in the ion-exchange processes to achieve the desired compressive strength and depth of layer. Accordingly, it should be generally understood that, during ion-exchange, a smaller ions in the glass are exchanged with larger ions to achieve the desired compressive stress and depth of layer. Moreover, the chemical strengthening process may be a single-ion-exchange process or an ion-exchange process in which multiple ions are exchanged to produce a complex diffusion profile (e.g., a double-ion-exchange process).

Figure 1B:
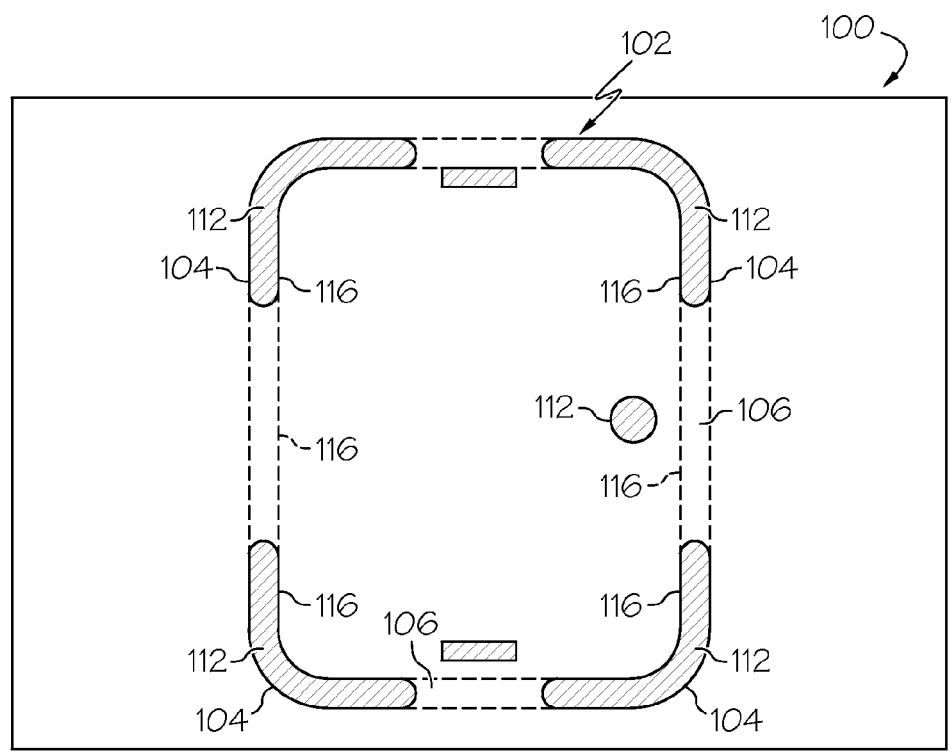
FIG. 1B schematically depicts the glass sheet of FIG. 1A with the plurality of channel segments between the glass substrate and the glass sheet filled with a filler material, according to one or more embodiments of a method for extracting a strengthened glass substrate from a glass sheet shown and described herein.

Referring now to FIG. 1B, in one embodiment, the channel segments 104 and any through-features may be plugged after the glass sheet 100 and the glass substrate 102 have been strengthened. Plugging the channel segments 104 and any through-features provides a flat, continuous surface to which a coating material may be applied thereby mitigating the occurrence of defects in the coating material.

In one embodiment, the channel segments 104 and the through-features (when present) are optionally plugged with a filler material 112 which fills and conforms to the shape of the channel segments 104 and the through-features. For example, the filler material 112 may be a UV-curable polymer resin or a thermally curable polymer resin which is deposited in the channel segments 104 and through-features. The polymer resin is then cured to solidify the resin and thereby improve the mechanical strength of the glass sheet 100 during subsequent processing. Alternatively, the filler material 112 may be a frit material, such as a glass frit or ceramic frit, which is deposited in the channel segments 104 and through-features as a paste and thereafter cured (i.e., dried) to solidify the paste thereby improving the mechanical strength of the glass sheet 100. In yet another embodiment, the filler material 112 may be a wax-based material which is initially deposited in the channel segments 104 and the through-features as a liquid and then solidified, such as by cooling, to improve the mechanical strength of the glass sheet 100.

In another embodiment (not shown), the channels segments 104 and the through-features (when present) may be plugged by applying a film to the top and bottom surfaces of the glass sheet 100 such that the channels segments 104 and the through-features are covered. For example, a polymer film, such as a polyethylene film or similar polymer material, may be removably applied to the surfaces of the glass sheet 100 with an adhesive material such that the film covers the channel segments and the through-features. The film may be selectively applied to the glass sheet 100 such that only those portions of the glass sheet 100 having channel segments 104 and/or through-features are covered, thereby allowing other films and/or coating materials to be applied to the uncovered portions of the surface.

When a filler material is used to plug the channel segments 104 and the through-features, it should be understood that the filler material 112 should be selected such that the filler material 112 can be easily removed from the glass sheet 100 without imparting significant mechanical stress on the glass sheet 100 or the glass substrate 102. However, it should be understood that plugging the channel segments 104 is optional and, in other embodiments, the glass sheet 100 may be further processed without plugging the channel segments 104 and the through-features.

Figure 1C:
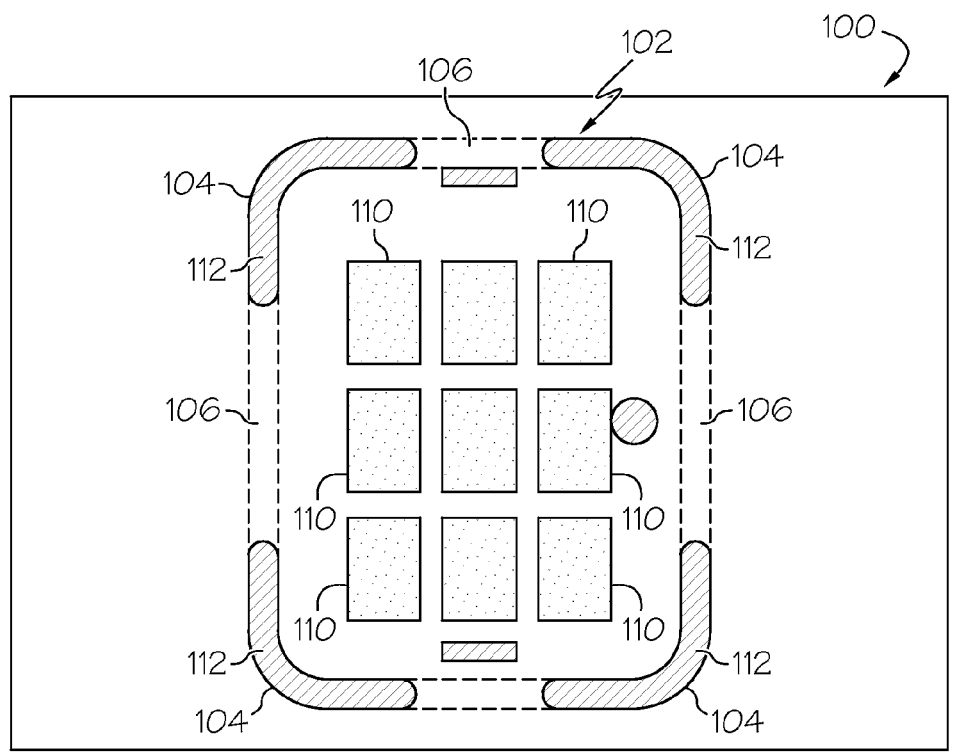
FIG. 1C schematically depicts a glass substrate connected to a glass sheet with a coating material applied to the glass substrate, according to one or more embodiments of a method for extracting a strengthened glass substrate from a glass sheet shown and described herein.

Referring now to FIG. 1C, in one embodiment, a coating material is applied to the glass sheet 100 after chemically strengthening and plugging the glass sheet (or directly after strengthening the glass sheet, such as when the glass sheet is not plugged). In the embodiments described herein, the coating material 110 is selectively applied to the glass sheet 100 in a predetermined pattern to enable touch screen functionality on the glass substrate 102 of the glass sheet 100. For example, an electrically-conductive and optically-transparent material may be applied to the glass sheet 100 in a predetermined pattern by first applying a masking agent to the glass sheet 100 to define the pattern. Thereafter, the electrically-conductive and optically-transparent coating material 110 is applied to the glass sheet 100 in the unmasked areas. In the embodiment shown in FIG. 1C, the electrically-conductive and optically-transparent material is applied to the glass sheet 100 to define a plurality of touch-activated areas on the glass substrate. However, it should be understood that the pattern of the electrically-conductive and optically-transparent material may be varied depending on the specific needs of the application in which the glass substrate 102 is to be employed. The electrically-conductive and optically-transparent material may be any material suitable for imparting touch screen functionality to the glass substrate 102 of the glass sheet 100 including, without limitation, indium tin oxide, aluminum zinc oxide, conductive polymers, or similar conductive materials. The electrically-conductive and optically-transparent material may be applied to the glass sheet 100 by electron beam deposition, sputtering, physical vapor deposition, spin coating or similar deposition techniques.

While one embodiment of the method for extracting a glass substrate from a glass sheet is described herein as comprising the step of applying a coating material to the glass sheet, it should be understood that this step is optional and that, in other embodiments, the glass substrate may be extracted from the glass sheet without applying a coating material to the glass sheet.

Figure 1D:
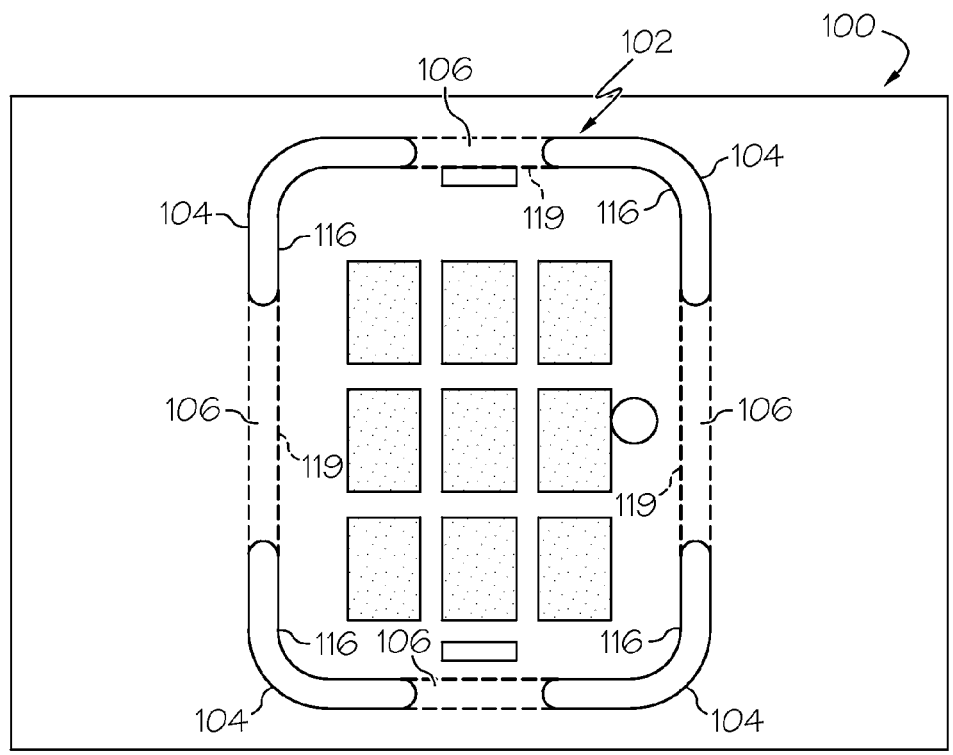
FIG. 1D schematically depicts a glass substrate separated from a glass sheet along a plurality of remnant webs between the glass substrate and the glass sheet, according to one or more embodiments of a method for extracting a strengthened glass substrate from a glass sheet shown and described herein.

Referring now to FIG. 1D, in embodiments where the channel segments 104 and the through-features of the glass substrate 102 are plugged prior to application of the coating material 110, the filler material may be removed from the channel segments 104 and through-features after application of the coating material 110. For example, in embodiments where the filler material is a polymer resin or frit, a suitable solvent may be used to partially or fully dissolve the filler material and thereby remove the filler material from the channel segments 104 and the through-features. In embodiments where the filler material is a wax-based material, the substrate may be heated to remove the wax or the wax may otherwise be removed by application of a suitable solvent. In still other embodiments, such as when the filler material is a film, the film may be peeled from the glass sheet or dissolved with a suitable solvent.

Figure 1E:
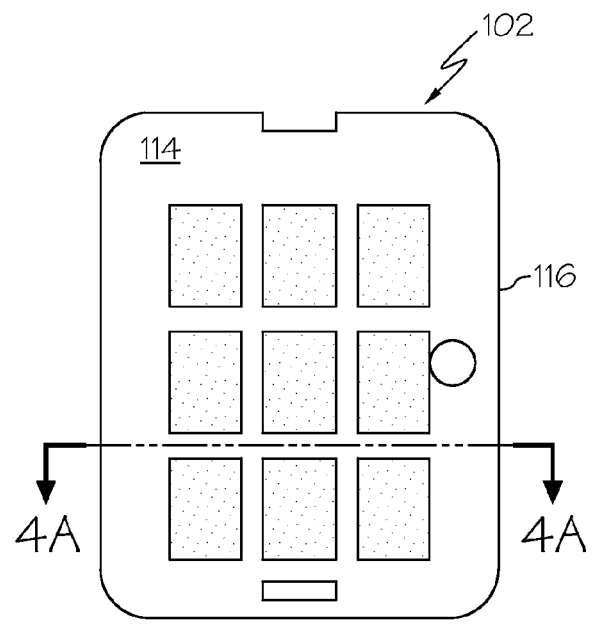
FIG. 1E schematically depicts a glass substrate separated from a glass sheet according to one or more embodiments described herein.
Figure 1F:
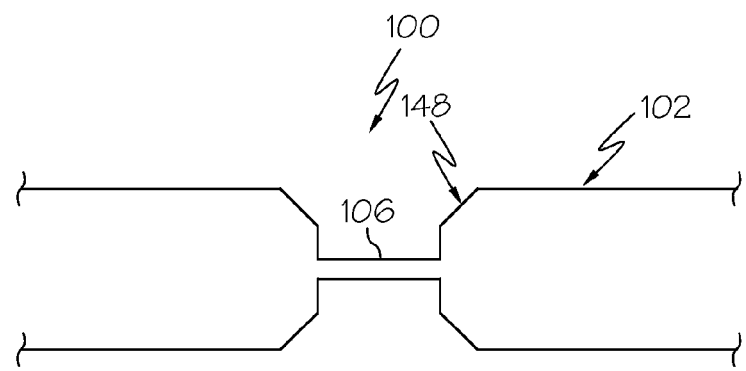
FIG. 1F schematically depicts a cross section of a glass sheet with a thinned glass web, according to one or more embodiments shown and described herein.

Referring now to FIGS. 1D and 1E, the glass substrate 102 may be removed from the glass sheet 100 by severing the glass substrate 102 from the remnant glass webs 106 along the perimeter 116 of the glass substrate 102. For example, in the embodiment shown in FIG. 1D, the perimeter 116 of the glass substrate 102 is severed from the remnant glass webs 106 along the separation lines 119 (generally indicated by dashed lines). The glass substrate 102 may be severed from the remnant glass webs 106 utilizing one of a variety of glass separation techniques including, without limitation, mechanical scoring and breaking techniques, laser scribing and breaking techniques, laser through cutting, water jet cutting, etching, abrading the glass sheet, and similar glass separation techniques.

Figure 4A:
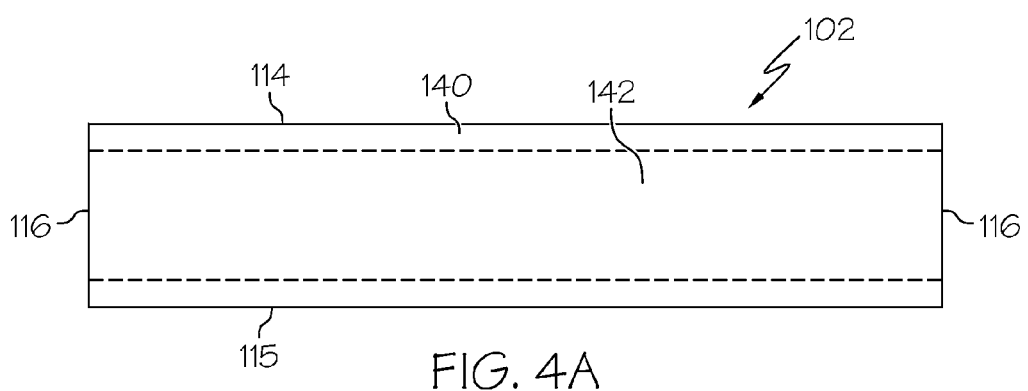
FIG. 4A schematically depicts a cross section of a strengthened glass substrate prior to finishing the perimeter of the strengthened glass substrate.

Referring now to FIG. 4A, a cross section of one embodiment of the glass substrate 102 of FIG. 1E is schematically depicted through a location where the glass substrate 102 was severed from the remnant glass webs. As shown in FIG. 4A, the top surface 114 and the bottom surface 115 intersect with the perimeter 116 at a sharp, 90 degree corner instead of with a bevel or chamfer as depicted in FIGS. 5 and 6. Furthermore, the layer of central tension 142 extends to the perimeter 116 of the glass substrate 102 thereby making the glass substrate 102 particularly susceptible to edge damage which, in turn, may lead to catastrophic failure of the glass substrate. Accordingly, in one embodiment, at least the portions of the perimeter 116 of the glass substrate 102 where the layer of central tension 142 is exposed are finished such that the perimeter of the glass substrate 102 is in compression. In another embodiment, the perimeter of the glass substrate 102 is finished to both shape the perimeter of the glass substrate and to place the perimeter 116 of the glass substrate in compression.

Figure 4B:
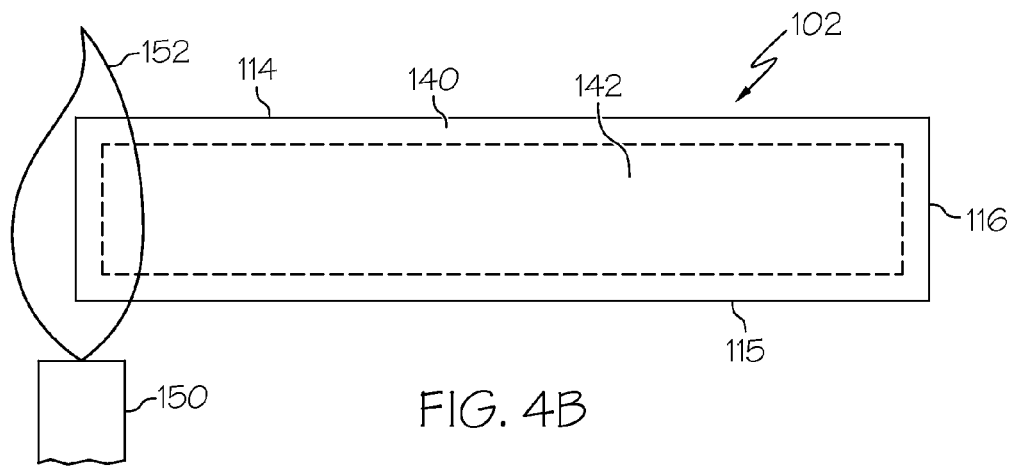
FIG. 4B schematically depicts a cross section of a strengthened glass substrate with the perimeter being finished by flame polishing.

Referring now to FIG. 4B, in one embodiment, the portion of the perimeter 116 with an exposed layer of central tension may be finished by imparting localized thermal energy to the perimeter 116 to place the perimeter 116 of the glass substrate 102 in compression. For example, the application of thermal energy to the perimeter causes the alkali ions from the chemically strengthened portions of the glass substrate 102 to diffuse further into the glass such that the layer of central tension 142 is enveloped by the layer of compressive stress 140 at the perimeter 116. The application of thermal energy may also be controlled so as to rapidly heat and cool the perimeter 116 to thermally temper the perimeter 116 of the glass substrate and develop additional compressive stress at the perimeter 116 in addition to any compressive stresses which develop along the perimeter due to the diffusion of ions. In one embodiment, the glass substrate is heated to about the softening point of the glass substrate (i.e., to a temperature where the dynamic viscosity of the glass is about $1 \times 10^{7.6}$ Poise) to enable the exchanged ions to further diffuse into the glass substrate. It should be understood that the exact temperature of the softening point varies with the composition of the glass substrate. For example, when the glass substrate is an alkali-aluminosilicate glass, the softening point is dependent on the ratio of alkali ions to alumina in the glass.

In one embodiment, the localized thermal energy applied to the substrate is sufficient to both strengthen the perimeter 116 of the glass substrate 102 and to make the perimeter 116 of the glass substrate 102 molten such that the portion of the perimeter 116 with the exposed layer of central tension is reshaped to correspond to the bevels or chamfers formed in the remaining portions of the perimeter 116. The process of imparting thermal energy may be specifically tailored to the thickness and composition of the glass substrate in order to achieve the desired amount of strengthening (i.e., compressive stress and depth of layer) as well as the desired perimeter geometry (i.e., a bevel or chamfer having the desired geometry). However, to both strengthen the glass substrate by increasing the depth of diffusion of the alkali ions and reshape the perimeter of the glass substrate, the glass substrate should be heated to the working point of the glass substrate (i.e., to a temperature where the dynamic viscosity of the glass is about $1 \times 10^{4}$ Poise). The viscosity of the glass at the working point is sufficiently low to enable viscous flow of the glass which, in turn, facilitates reshaping the perimeter of the glass to a desired shape. Moreover, the temperature of the glass at the working point is more than sufficient to enable ions already in the glass to diffuse further into the substrate in the heated area, thereby strengthening the heated area.

In the embodiments described herein, localized thermal energy may be imparted to the perimeter 116 by any one of a variety of techniques including, without limitation, flame-polishing, laser heating, radiant heating, controlled dielectric discharge and various combinations thereof. For example, in the embodiment depicted in FIG. 4B, the perimeter 116 is processed utilizing flame polishing. In this embodiment, a flame 152 is emitted from a burner 150 and traversed along the perimeter 116 of the glass substrate 102 thereby heating the glass substrate 102 and causing the ions to diffuse from the top surface 114 and the bottom surface 115 into the perimeter 116 thereby placing the perimeter in compression. The temperature and the duration of application of the flame 152 may be simultaneously controlled to temper the perimeter 116, thereby developing additional compressive stress in the perimeter. The application of the flame 152 is also controlled such that the perimeter 116 is reshaped to the desired geometry. Following processing, the perimeter 116 of the glass substrate is under compression and has the desired geometry, such as a bevel (as depicted in FIG. 5) or a chamfer (as depicted in FIG. 6).

Figure 3A:
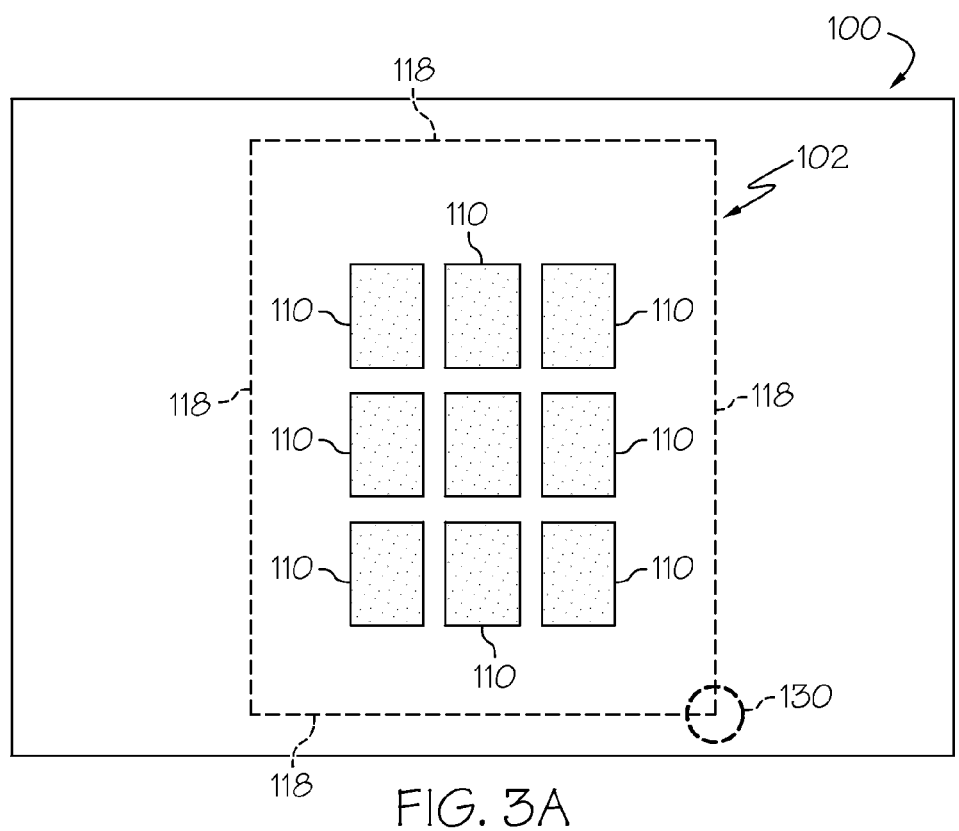
FIG. 3A schematically depicts a glass sheet with a coating material deposited on a substrate portion of a strengthened glass sheet, according to one or more embodiments of a method for extracting a strengthened glass substrate from a glass sheet shown and described herein.
Figure 3B:
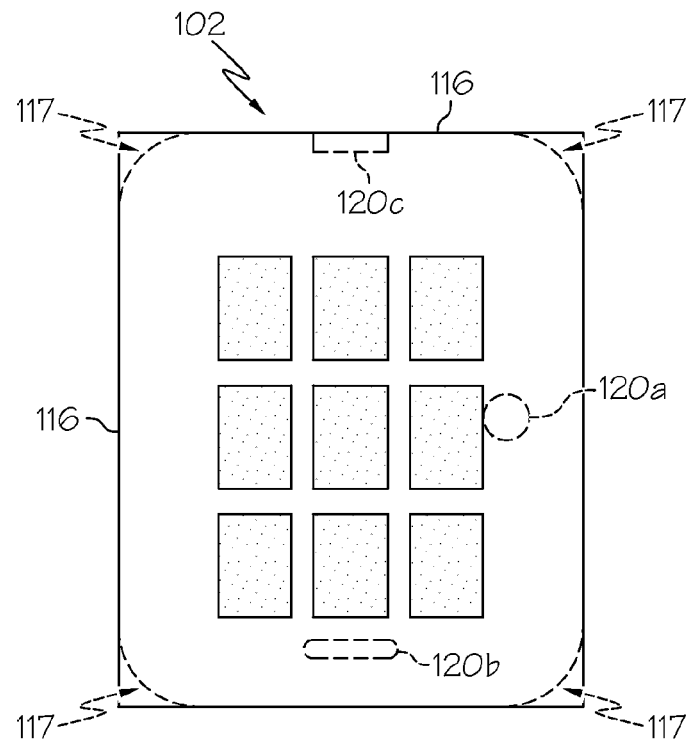
FIG. 3B schematically depicts the substrate portion of FIG. 3A separated from the glass sheet, according to one or more embodiments of a method for extracting a strengthened glass substrate from a glass sheet shown and described herein.
Figure 3C:
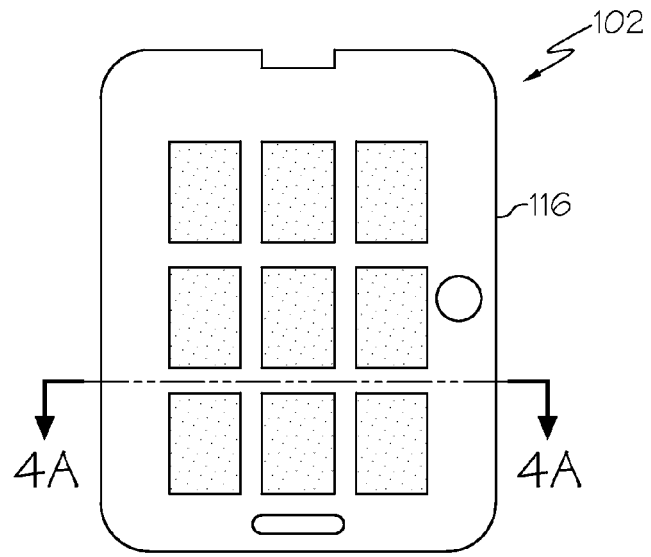
FIG. 3C schematically depicts a strengthened glass substrate according to one or more embodiments shown and described herein.

Referring now to FIGS. 3A-3C, another embodiment of a method for extracting a glass substrate 102 from a glass sheet 100 is schematically depicted. As described above, the glass sheet generally has a thickness from about 0.5 mm to about 2.5 mm and may be formed from borosilicate glass, aluminosilicate glass or other, similar glass materials which may be chemically strengthened, such as by ion-exchange processes. In this embodiment, the glass sheet 100 is initially chemically strengthened by ion-exchange, as described above, to introduce a compressive stress in the surfaces of the glass sheet 100 to the desired depth of layer. The step of chemically strengthening the glass sheet 100 is performed prior to forming any through-features in the glass sheet. In one embodiment, the glass sheet has a compressive stress and depth of layer such that the glass sheet may be further processed (such as by machining, laser processing, water jet cutting and/or similar processing operations) without risk of introducing flaws in the glass due to the processing operations. For example, in one embodiment, the compressive stress may be from about 200 MPa to about 1000 MPa. In another embodiment, the compressive stress may be from about 500 MPa to about 800 MPa. In yet another embodiment, the compressive stress may be from about 650 MPa to about 900 MPa. In one embodiment, the depth of layer D may be from about 10 microns to about 80 microns. In another embodiment, the depth of layer D may be from about 30 microns to about 60 microns. In yet another embodiment, the depth of layer D may be from about 40 microns to about 60 microns.

Referring to FIG. 3A, in one embodiment, a coating material is applied to the glass sheet 100 after the glass sheet has been strengthened. In the embodiments described herein, the coating material 110 is selectively applied to the glass sheet 100 in a predetermined pattern to enable touch screen functionality on the glass substrate 102 of the glass sheet 100. For example, an electrically-conductive and optically-transparent material may be applied to the glass sheet 100 in a predetermined pattern by first applying a masking agent to the glass sheet 100 to define the pattern. Thereafter, the electrically-conductive and optically-transparent material is applied to the glass sheet 100 in the unmasked areas. In the embodiment shown in FIG. 3A, the electrically-conductive and optically-transparent material is applied to the glass sheet 100 to define a plurality of touch-activated areas. However, it should be understood that the pattern of the electrically-conductive and optically-transparent material may be varied depending on the specific needs of the application in which the glass substrate 102 of the glass sheet 100 is to be employed. The electrically-conductive and optically-transparent material may be any material suitable for imparting touch screen functionality to the glass substrate 102 of the glass sheet 100 including, without limitation, indium tin oxide, aluminum zinc oxide, conductive polymers, or similar conductive materials. The electrically-conductive and optically-transparent material may be applied to the glass sheet 100 by electron beam deposition, sputtering, physical vapor deposition, spin coating or similar deposition techniques.

While one embodiment of the method for extracting a glass substrate from a glass sheet is described herein as comprising the step of applying a coating material to the glass sheet, it should be understood that this step is optional and that, in other embodiments, the glass substrate may be extracted from the glass sheet without applying a coating material to the glass sheet.

Referring to FIGS. 3A and 3B, after the coating material 110 has been applied to the glass sheet 100, the glass substrate 102 is extracted from the glass sheet 100 along straight parting lines 118 using mechanical scoring and breaking techniques, laser scoring and breaking techniques, or similar glass separation techniques suitable for separating a glass sheet along straight parting lines. After separation, the glass substrate 102 has angular corners, such as the 90 degree corner 130 depicted in FIG. 3A. While the glass substrate 102 is depicted in FIGS. 3A and 3B as having a generally rectangular shape, it should be understood that, in other embodiments, the glass substrate may have other geometrical configurations after separation. For example, the glass substrate 102 may be octagonal, hexagonal, or any other polygon with straight edges.

Referring now to FIG. 3B, after the glass substrate 102 is separated from the glass sheet 100, one or more curved features are formed in the glass substrate 102 utilizing CNC machining, laser ablation, water jet cutting, or similar techniques. In the embodiment shown in FIG. 3B, the curved features are formed in the perimeter 116 of the glass substrate such that each corner 117 of the glass substrate has a radius of curvature. In one embodiment, the corner 117 may be formed with a uniform radius of curvature as shown in FIG. 2A where the first radius R1 equals the second radius R2. In another embodiment, the corner 117 may be formed with a spline having a compound radius of curvature, as depicted in FIG. 2B. For example, the radius of curvature of the corner 117 may decrease from a maximum radius R1 to a minimum radius R2.

While the embodiments shown in FIGS. 3B and 2A-2B depict a curved feature forming a corner 117 of the glass substrate 102, it should be understood that various other curved features may be formed in the perimeter of the glass substrate 102. For example, the curved feature may be formed along the perimeter 116 of the glass substrate 102 in a location other than the corner 117, such as when one or more curved features, such as curved or rounded corners, are formed in the perimeter 116 of the substrate along a length of the glass substrate 102. In one embodiment, the maximum radius of curvature of the curved feature is less than about 10 mm. In another embodiment, the maximum radius of curvature of the curved feature is 5 mm or less or even 2 mm or less. However, it should be understood that curved features with a maximum radius greater than about 10 mm may also be formed in substrate.

In one embodiment, through-features 120a, 120b, 120c may also be formed in the glass substrate 102, as depicted in FIG. 3B. The through-features may extend through the thickness of the glass substrate 102 and may comprise a variety of different geometries. For example, the through-features may be circular apertures 120a, slots 120b or notches 120c, as depicted in FIG. 3B. However, it should be understood that through-features with various other regular or irregular geometrical configurations may also be formed. In the embodiments described herein, the through-features may be formed in the glass substrate using the same techniques utilized to form the curved features at the perimeter of the substrate. While the through-features may be formed with various radii, in some embodiments, the maximum radius of curvature of the through-feature may be less than 10 mm. In other embodiments, the maximum radius of curvature may be less than about 5 mm, or even less than about 2 mm.

The formation of through-features in the glass substrate 102 of the glass sheet 100 is optional. For example, in one embodiment, the glass substrate 102 of the glass sheet 100 may be formed without through-features while in other embodiments one or even a plurality of through-features may be formed in the glass substrate 102 of the glass sheet 100.

As described hereinabove, the glass sheet 100 depicted in FIG. 3A is chemically strengthened by ion-exchange prior to the glass substrate 102 being extracted from the glass sheet 100. Accordingly, after the glass substrate 102 is extracted from the glass sheet 100, the central layer of central tension 142 of the glass substrate 102 is exposed at the perimeter 116 of the glass substrate, as depicted in FIG. 4A. Further, the top surface 114 and the bottom surface 115 intersect with the perimeter 116 at a sharp, 90 degree corner instead of with a bevel or chamfer, as depicted in FIGS. 5 and 6. This 90 degree corner may be susceptible to chipping or other damage which may ultimately lead to failure of the glass substrate 102. Accordingly, in one embodiment, the perimeter 116 of the glass substrate 102 is further processed to place the perimeter 116 of the glass substrate in compression, as described hereinabove with respect to FIG. 4B. In another embodiment, the perimeter 116 of the substrate is processed to both reshape the perimeter and place the perimeter in compression.

Referring to FIGS. 3C and 4B, the perimeter 116 with an exposed layer of central tension may be finished by imparting thermal energy to the perimeter 116 to both shape the edge of the glass substrate and to place the perimeter 116 of the glass substrate 102 in compression, as described above. For example, in the embodiment depicted in FIG. 4B, the perimeter 116 is finished utilizing flame polishing. In this embodiment, a flame 152 is emitted from a burner 150 and traversed along the perimeter 116 of the glass substrate 102 thereby heating the glass substrate 102 and causing the ions to diffuse from the top surface 114 and the bottom surface 115 into the perimeter 116, thereby placing the perimeter in compression. The application of the flame 152 (i.e., the temperature of the flame and duration of application) may be controlled to simultaneously temper the perimeter 116, thereby developing additional compressive stress in the perimeter. The application of the flame 152 is also controlled such that the perimeter 116 is reshaped to the desired geometry. Following processing, the perimeter 116 of the glass substrate is under compression and has the desired geometry, such as a bevel (as depicted in FIG. 5) or a chamfer (as depicted in FIG. 6). Further, while FIG. 4B depicts the use of flame polishing, it should be understood that other techniques may be used to introduce compressive stress and/or reshape the perimeter of the substrate, as described above.

In the various examples of the methods for extracting shaped glass substrates from glass sheets shown and described herein, a single strengthened glass substrate is depicted as being extracted from a glass sheet. However, it should be understood that the techniques described herein may be utilized to extract multiple strengthened glass substrates from a single glass sheet. Accordingly, it will be understood that the methods described herein may be scaled to improve efficiency and economy.

It should now be understood that the methods described herein may be used to extract a strengthened glass substrate from a glass sheet such that the strengthened glass substrate has the desired resistance to damage, particularly around the perimeter of the strengthened glass substrate. At least a portion of the perimeter of the strengthened glass substrate includes a curved feature while one or more through-features may be formed through the thickness of the strengthened glass substrate. In some embodiments, the strengthened glass substrate may also comprise a coating material to enable touch functionality. The strengthened glass substrates extracted using the methods described herein have improved resistance to failure, particularly failures emanating from the perimeter of the shaped glass substrate.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A method of extracting a glass substrate from a glass sheet, the method comprising:
   providing an un-strengthened glass sheet having a defined thickness,
   forming a plurality of channel segments in the un-strengthened glass sheet,
     wherein the plurality of channel segments extend through the entire thickness of the glass sheet,
     wherein the plurality of channel segments are separated from each other by remnant glass webs connecting the glass substrate to the glass sheet, and
     wherein the plurality of channel segments and the plurality of remnant glass webs extend around and collectively define a perimeter of the glass substrate;
   strengthening the un-strengthened glass sheet and the connected glass substrate by ion-exchange to produce a strengthened glass substrate connected to a strengthened glass sheet; and
   separating the strengthened glass substrate from the strengthened glass sheet by severing the strengthened glass substrate from the remnant glass webs.

2. The method of claim 1, further comprising applying a coating material to the glass sheet after the glass sheet is strengthened and before the strengthened glass substrate is separated from the strengthened glass sheet.

3. The method of claim 2, wherein the coating material comprises an optically-transparent and electrically-conductive material.

4. The method of claim 2, wherein the coating material is indium tin oxide or aluminum zinc oxide.

5. The method of claim 2, further comprising plugging the plurality of channel segments prior to applying the coating material to the strengthened glass sheet.

6. The method of claim 1, further comprising forming a through-feature in the un-strengthened glass substrate.

7. The method of claim 1, further comprising:
   forming bevels or chamfers in the perimeter of the glass substrate adjacent to the plurality of channel segments as the channel segments are formed in the un-strengthened glass sheet; and
   forming bevels or chamfers in the perimeter of the glass substrate adjacent the remnant glass webs, wherein the bevels or chamfers in the perimeter of the glass substrate adjacent to the remnant glass webs have the same geometry and dimensions of the bevels or chamfers formed in the perimeter of the glass substrate adjacent to the plurality of channel segments.

8. The method of claim 1, wherein the remnant glass webs have a thickness which is less than the thickness of the un-strengthened glass sheet.

9. The method of claim 1, further comprising finishing the perimeter of the strengthened glass substrate such that the perimeter of the glass substrate is under compression.

10. The method of claim 9, wherein finishing the perimeter of the strengthened glass substrate comprises heating the strengthened glass substrate to at least a softening point of the glass substrate.

11. The method of claim 9, wherein finishing the perimeter of the strengthened glass substrate comprises reshaping the perimeter of the glass substrate by heating the strengthened glass substrate to at least a working point of the glass substrate.

12. The method of claim 1, further comprising annealing the un-strengthened glass sheet after forming the plurality of channel segments in the un-strengthened glass sheet and before strengthening the glass sheet.

* * * * *